[2.]

ISAAC HICKS.
Potato Digger.

No. 119,461.  Patented Oct. 3, 1871.

Witnesses.  
W. W. J. Murphy.  
H. A. Daniels

Inventor.  
Isaac Hicks  
By R. H. Boynton, his Attorney

UNITED STATES PATENT OFFICE.

ISAAC HICKS, OF HARTFORD, WISCONSIN.

IMPROVEMENT IN POTATO-DIGGERS.

Specification forming part of Letters Patent No. 119,461, dated October 3, 1871.

*To all whom it may concern:*

Be it known that I, ISAAC HICKS, of the town of Hartford, in Washington county, Wisconsin, have invented certain Improvements in Machinery for Potato-Diggers, of which the following is a specification:

My invention consists in the construction and use of a broad-faced wheel with diagonal openings and flanges, in combination with a plow so constructed that it will raise the potatoes from the hills and turn them into the wheels.

Figure 1:
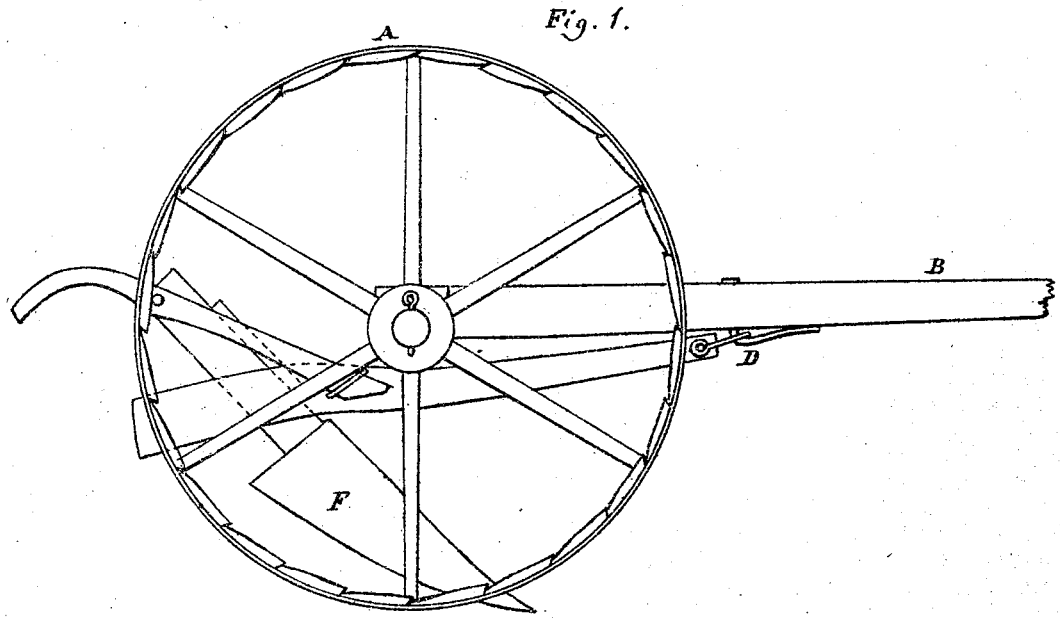
Figure 2:
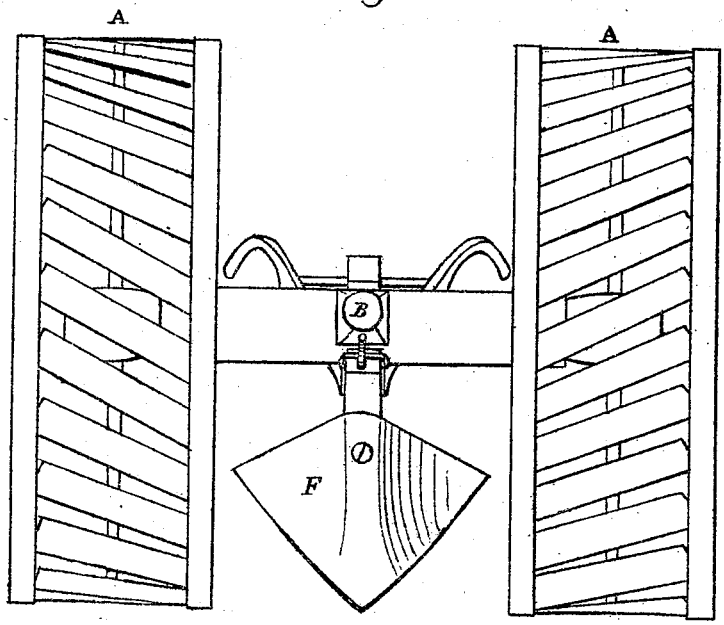

Figure 1 is a side elevation of the machine. Fig. 2 is an end view of the same as it would appear to one standing at the right of Fig. 1.

A A are wheels, the hubs and spokes of which may be constructed in any manner suitable and sufficient to support the rim or face of the wheel. The face or rim is broad, with openings and flanges running diagonally across it. The openings should be as large as possible without allowing the potatoes to pass through. The flanges should be sufficiently high to prevent potatoes from pressing over them. B is the tongue, to which the team is to be attached for hauling the machine. F is the plow, which may be made in the form of a shovel, or in any form suitable for raising the potatoes and turning them into the wheels. The beam of the plow is attached to the tongue with a loose connection, as seen at D in Fig. 1.

I do not wish to confine myself to the use of two wheels, nor to a plow turning both ways, for practice demonstrates that a machine with one wheel, constructed in the manner set forth, in connection with a plow turning toward it, becomes an efficient one for the purposes set forth.

The machine being properly adjusted and put in motion, the potatoes and soil will be turned upon the inside of the rim of the wheels, which, by their revolutions, throw the potatoes and soil against the flanges, the effect of which is to separate the soil from the potatoes, the soil falling through the openings in the rim and the potatoes rolling off outside the wheel in a row or rows, free from dirt.

What I claim as new, and wish to secure by Letters Patent, is—

The combination, in a potato-digger, of a single or double mold-board plow, F, with respectively one wheel, A, or a pair of wheels, A A, constructed with an inner and outer rim joined together by strips with open spaces between, such strips being placed diagonally forward and outward, each having upon its forward edge a flange for the purpose of raising and carrying the potatoes to the outside of the wheel or wheels.

ISAAC HICKS.

Witnesses:
ORLO B. GRAVES,
J. W. WOODRUFF.

(2)